S. B. THOMAS.
FRYING PAN COVER.
APPLICATION FILED JAN. 22, 1910.
984,318.
Patented Feb. 14, 1911.
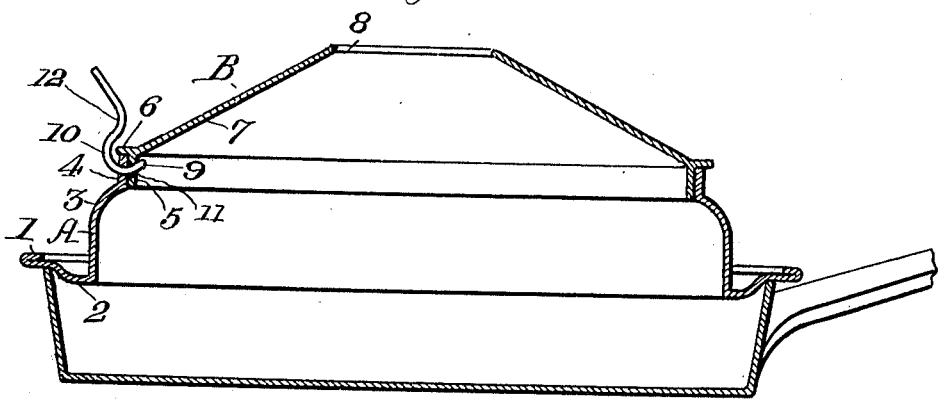
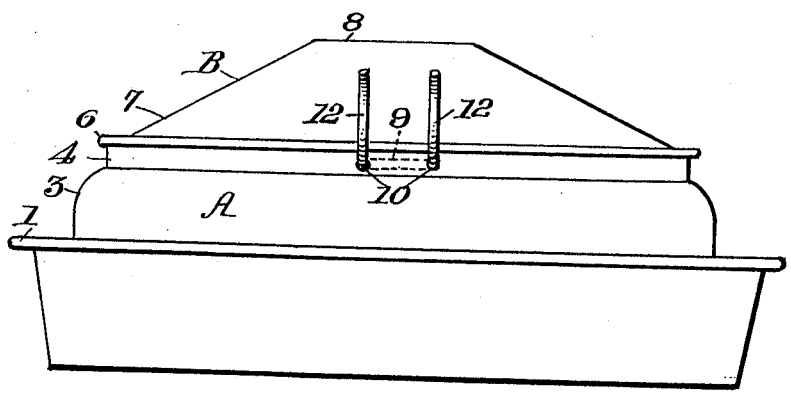
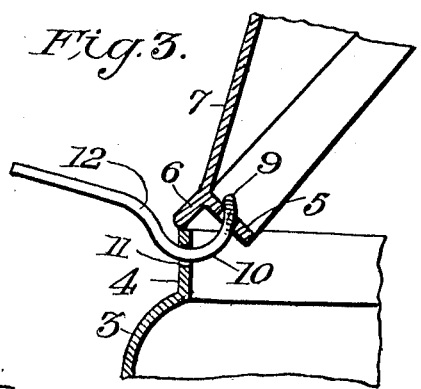
Witnesses
Inventor
S. B. Thomas
By ......, Attorneys.

UNITED STATES PATENT OFFICE.

SAMUEL B. THOMAS, OF MANCHESTER, NEW HAMPSHIRE.

FRYING-PAN COVER.

984,318.

Specification of Letters Patent. Patented Feb. 14, 1911.

Application filed January 22, 1910. Serial No. 539,523.

*To all whom it may concern:*

Be it known that I, SAMUEL B. THOMAS, a citizen of the United States, residing at Manchester, in the county of Hillsboro and State of New Hampshire, have invented certain new and useful Improvements in Frying-Pan Covers, of which the following is a specification.

This invention comprehends certain new and useful improvements in culinary utensils or appliances and the invention has for its primary object, an open top cover for frying pans designed to prevent the grease from spattering on the floor and also protecting the top of the stove, thereby saving the house from the disagreeable smudge and the odors that are occasioned by burning grease.

With these and other objects in view as will more fully appear as the description proceeds, the invention consists essentially in an open top frying pan cover embodying lower and upper sections, the lower section being designed to rest on a skillet, frying pan or the like and the upper section being hingedly and detachably connected to the lower section and formed with a relatively contracted top opening, so that the upper section may be used in conjunction with the lower section in frying fish or sausage or other edibles of similar nature.

The invention also consists in certain constructions, arrangements and combinations of the parts that I shall hereinafter fully describe and claim.

For a full understanding of the invention, reference is to be had to the following description and accompanying drawings in which—

Figure 1 is a diametrical sectional view of a frying pan cover constructed in accordance with my invention; Fig. 2 is a side elevation thereof, the view being taken at right angles to Fig. 1; Fig. 3 is an enlarged fragmentary sectional view illustrating the upper section of the cover in partially tilted position; and, Fig. 4 is a detail perspective view of a hinge employed.

Corresponding and like parts are referred to in the following description and indicated in all the views of the accompanying drawings by the same reference characters.

My improved open top frying pan cover embodies a lower section A and an upper section B each of which may be made of sheet metal and of any desired number of parts. The lower section A embodies a semicircular rim 1 which is preferably dished or provided at its inner edge with an annular rim or bead 2 from which the main body portion 3 of the cover rises. The body portion 3 is preferably concavo-convex in cross section and curves upwardly and thence inwardly as shown, terminating at its upper edge in an upstanding annular flange 4. The upper section B is in the form of a truncated cone of any desired inclination and includes a depending base flange 5 and a bead 6 at the upper end of said flange. The body portion 7 of the upper section extends inwardly from the bead and has an open upper end 8 of any desired diameter, although of smaller diameter than the open flange 4 of the lower section A. In the applied position of the parts, the upper section B is fitted on the lower section A, the flange 5 being slipped downwardly within the flange 4 and the upper section, in closed position, resting with its bead 6 on the upper edge of said flange 4. The upper section B is connected to the lower section A by a wire hinge embodying a cross bar 9 located on the inner wall of the flange 5, and two outwardly and upwardly curving arms 10 which are connected at one end to the cross bar 9 and which extend out through openings 11 formed in the flange 4, said arms being provided with shoulders 12, as shown.

It will be understood that whenever it is desired to open the device so as to give attention to the contents of the frying pan, skillet or the like, the upper section may be swung back on the hinge to the position illustrated in Fig. 3, the arms 10 moving inwardly in the openings 11 until the shoulders are reached, when the upper section will be securely held in a tilted position. Manifestly the upper section may be easily detached by springing the arms 10 inwardly, thus stripping them entirely from the openings 11 in which they are received.

From the foregoing description in connection with the accompanying drawing, the operation of my improved open top frying pan cover will be apparent.

In the practical use of the device, it is rested on the rim of the frying pan so that the body portion 3 will extend upwardly and inwardly over the pan and prevent the grease from spattering out over the stove and floor, while at the same time interfering in no wise with the placing of food within the pan, or removing it therefrom, and also without preventing the cook from viewing the contents of the pan from time to time as required. By the use of the upper section B of the device, a further preventive of spattering is provided which can be easily applied whenever necessary and as readily removed, or swung to an open position whenever it is desired to view the contents of the pan.

Having thus described the invention, what is claimed as new is:

As a new article of manufacture, the herein described open top frying pan cover comprising upper and lower sections formed with interfitting flanges, said flanges being formed with registering openings, and a hinge detachably connecting said sections together, said hinge embodying a cross-bar lying against the inner wall of the innermost flange, and curved arms passing through the registering openings in an outward direction, the arms being formed intermediate of their ends with shoulders for the purpose specified.

In testimony whereof I affix my signature in presence of two witnesses.

SAMUEL B. THOMAS.

Witnesses:
 HENRY N. HURD,
 J. B. CAVANAUGH.